Jan. 3, 1928.
J. V. HULSE
1,655,099
METHOD OF GRINDING
Filed Oct. 6, 1925 11 Sheets-Sheet 3
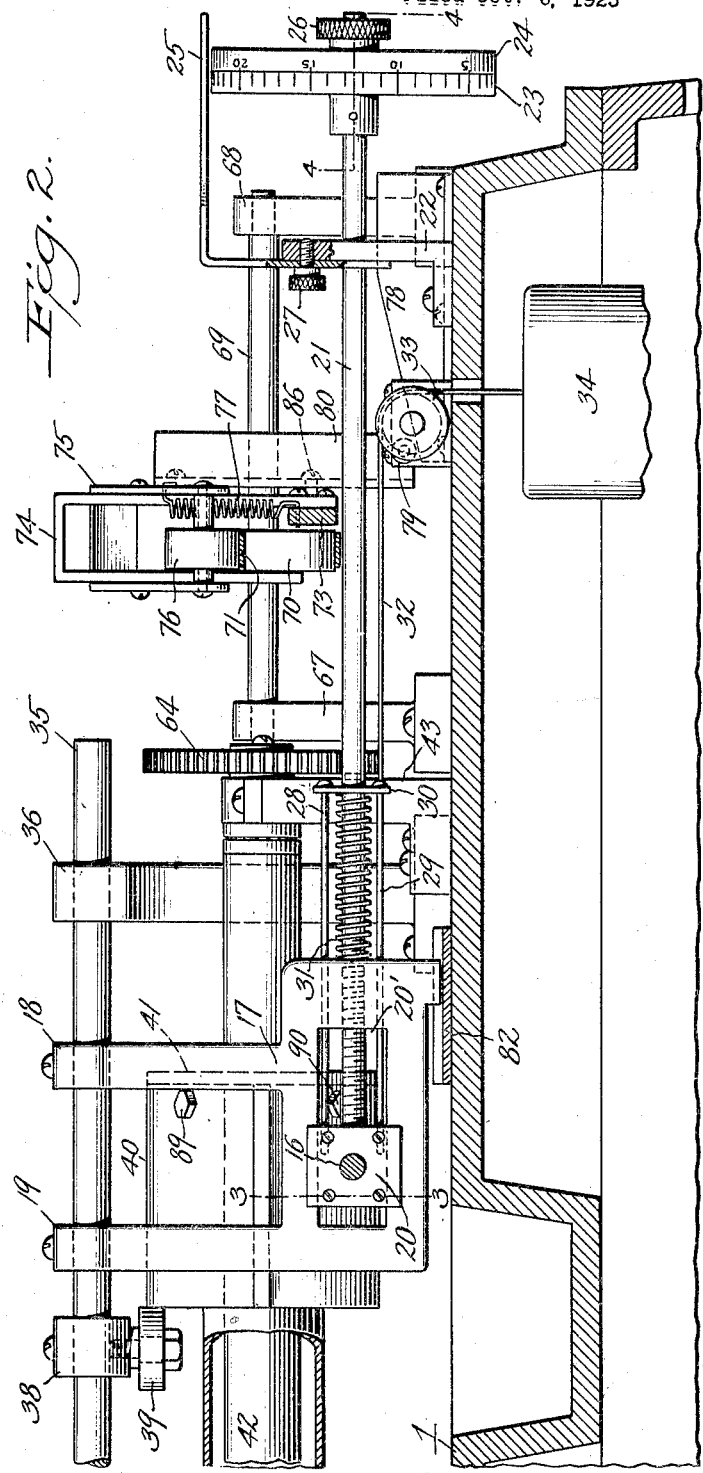
INVENTOR
JAMES V. HULSE
BY Knight Bros
ATTORNEYS

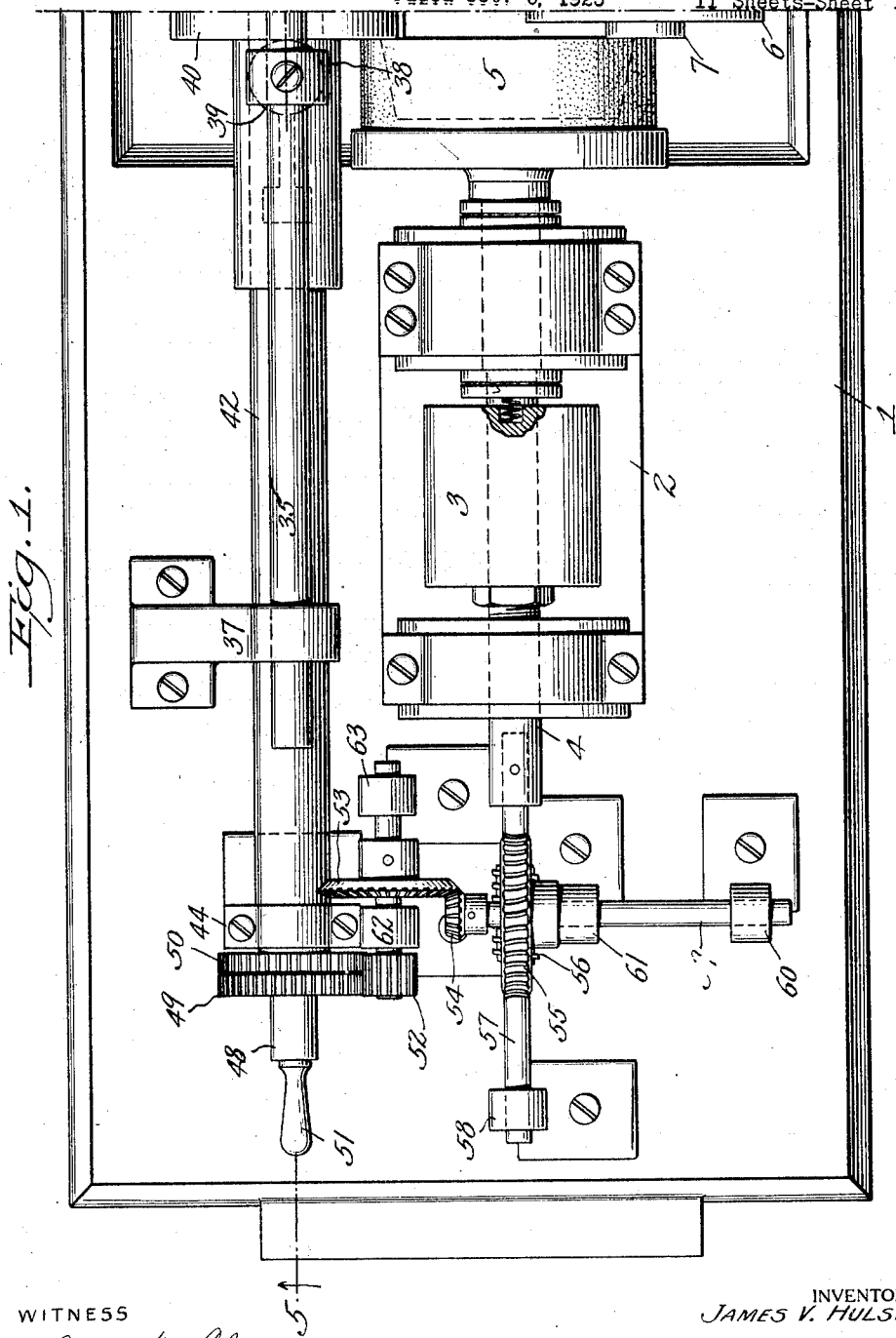

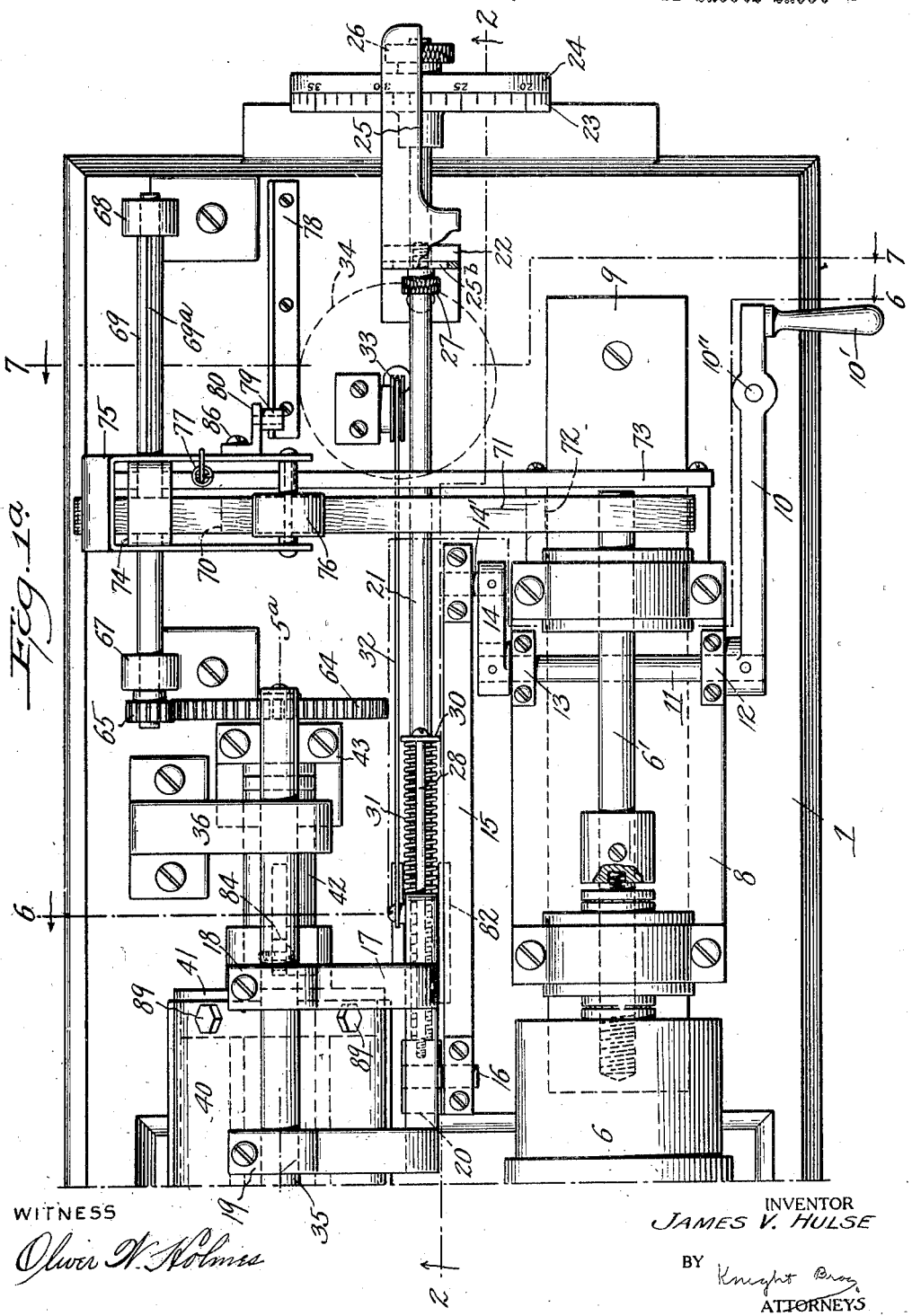

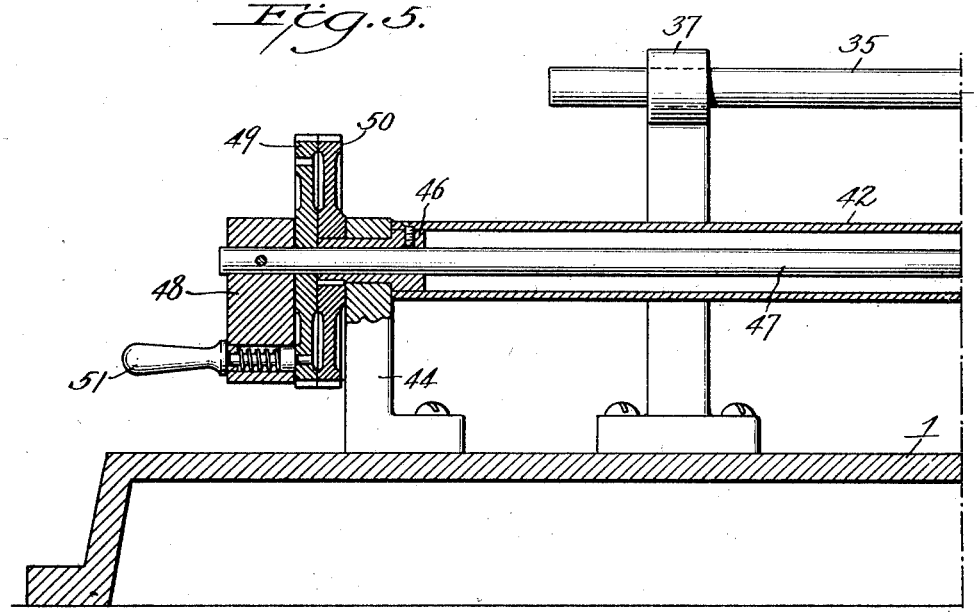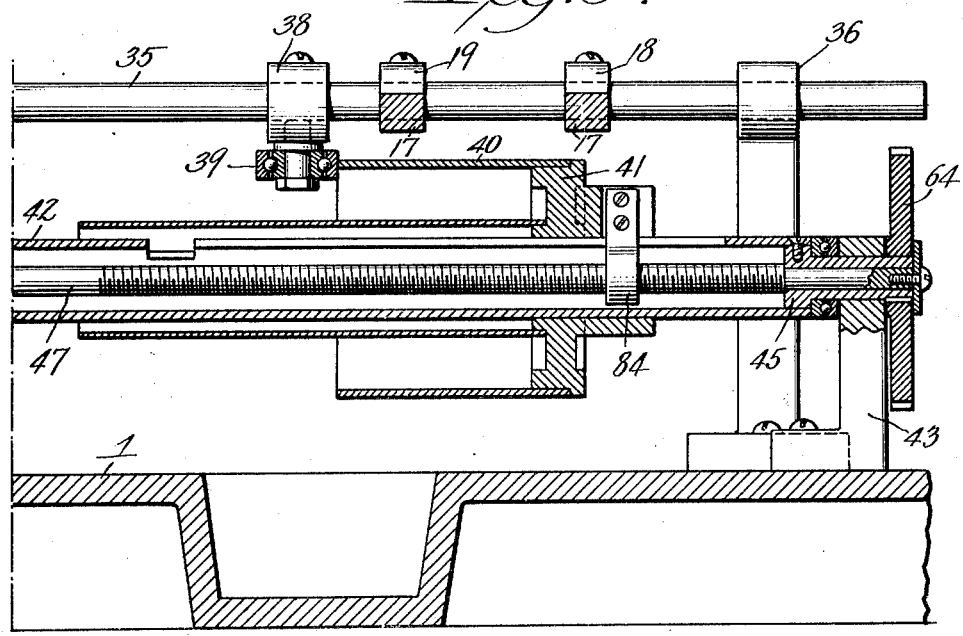

Jan. 3, 1928.

J. V. HULSE 1,655,099

METHOD OF GRINDING

Filed Oct. 6, 1925     11 Sheets-Sheet 5

WITNESS

INVENTOR
JAMES V. HULSE

BY
ATTORNEYS

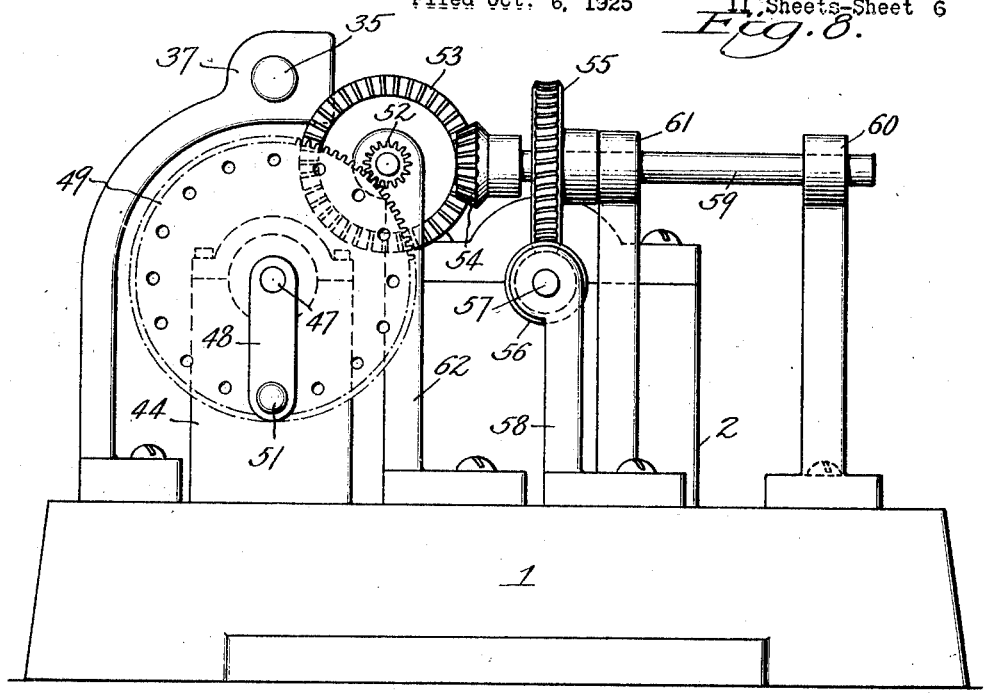
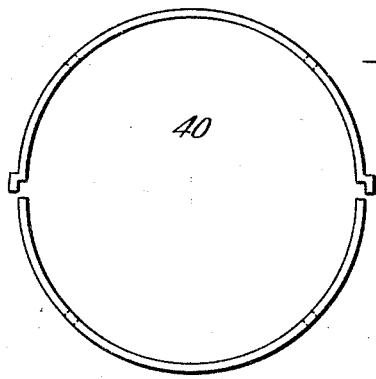
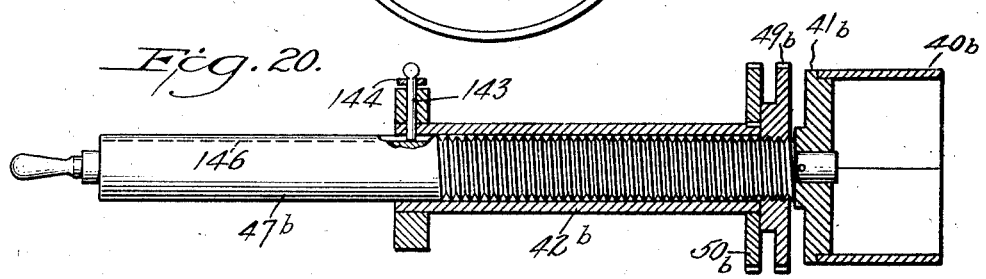

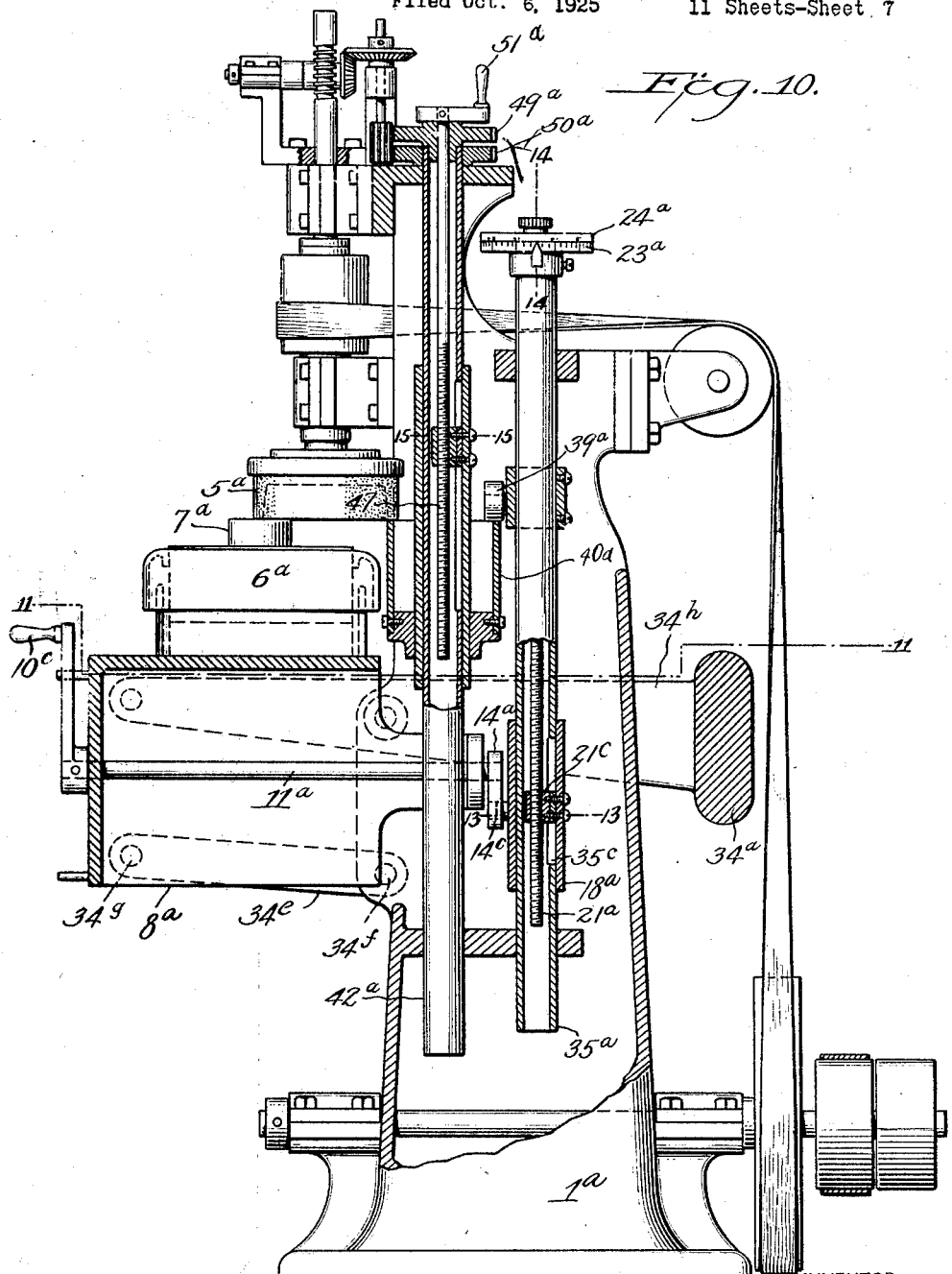

Jan. 3, 1928.

J. V. HULSE 1,655,099

METHOD OF GRINDING

Filed Oct. 6, 1925    11 Sheets-Sheet 8

WITNESS
Oliver W. Holmes

INVENTOR
JAMES V. HULSE

BY Knight Bro
ATTORNEYS

Jan. 3, 1928.
J. V. HULSE
1,655,099
METHOD OF GRINDING
Filed Oct. 6, 1925   11 Sheets-Sheet 9
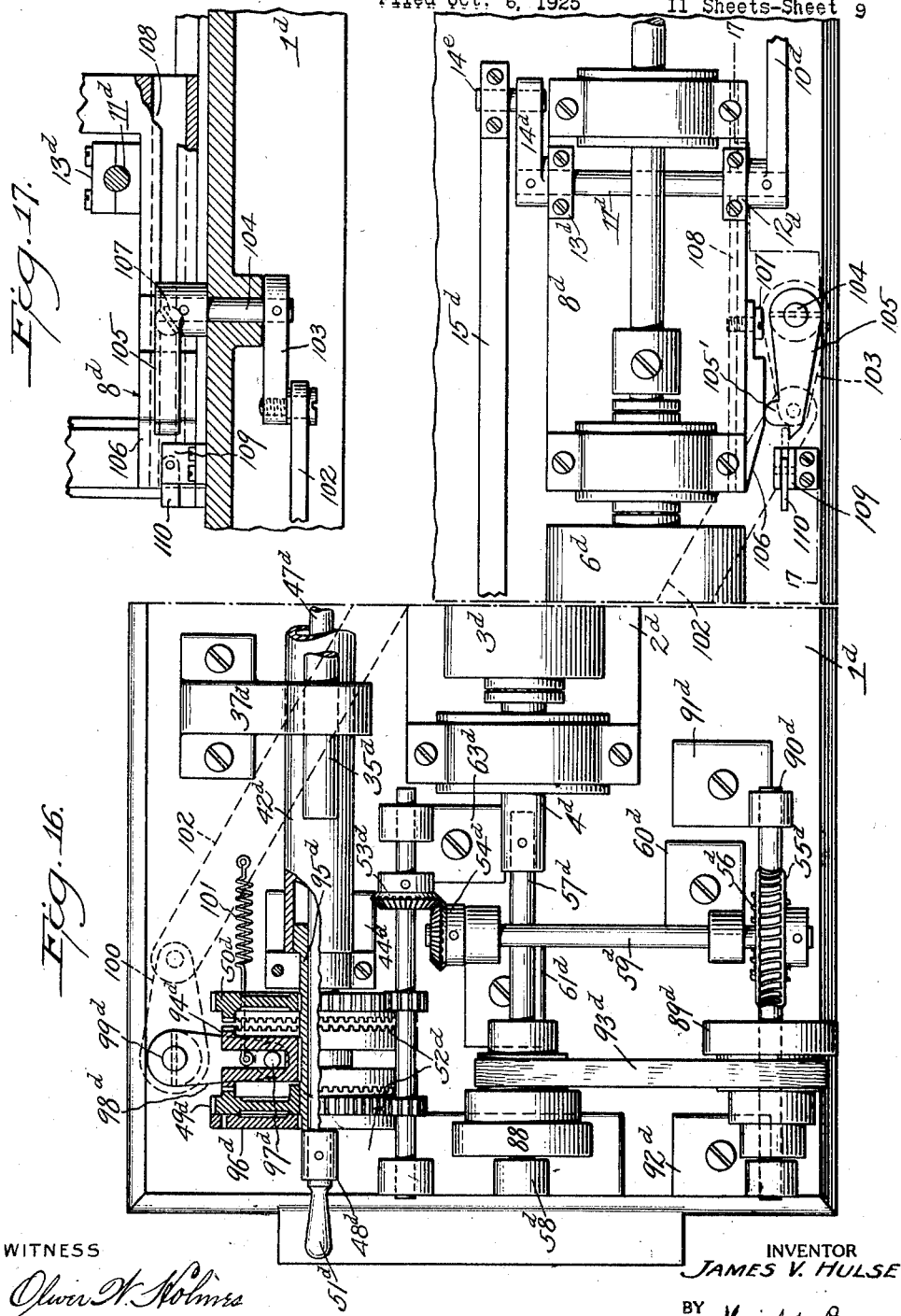
WITNESS
Oliver N. Holmes
INVENTOR
JAMES V. HULSE
BY Knight Bro
ATTORNEYS

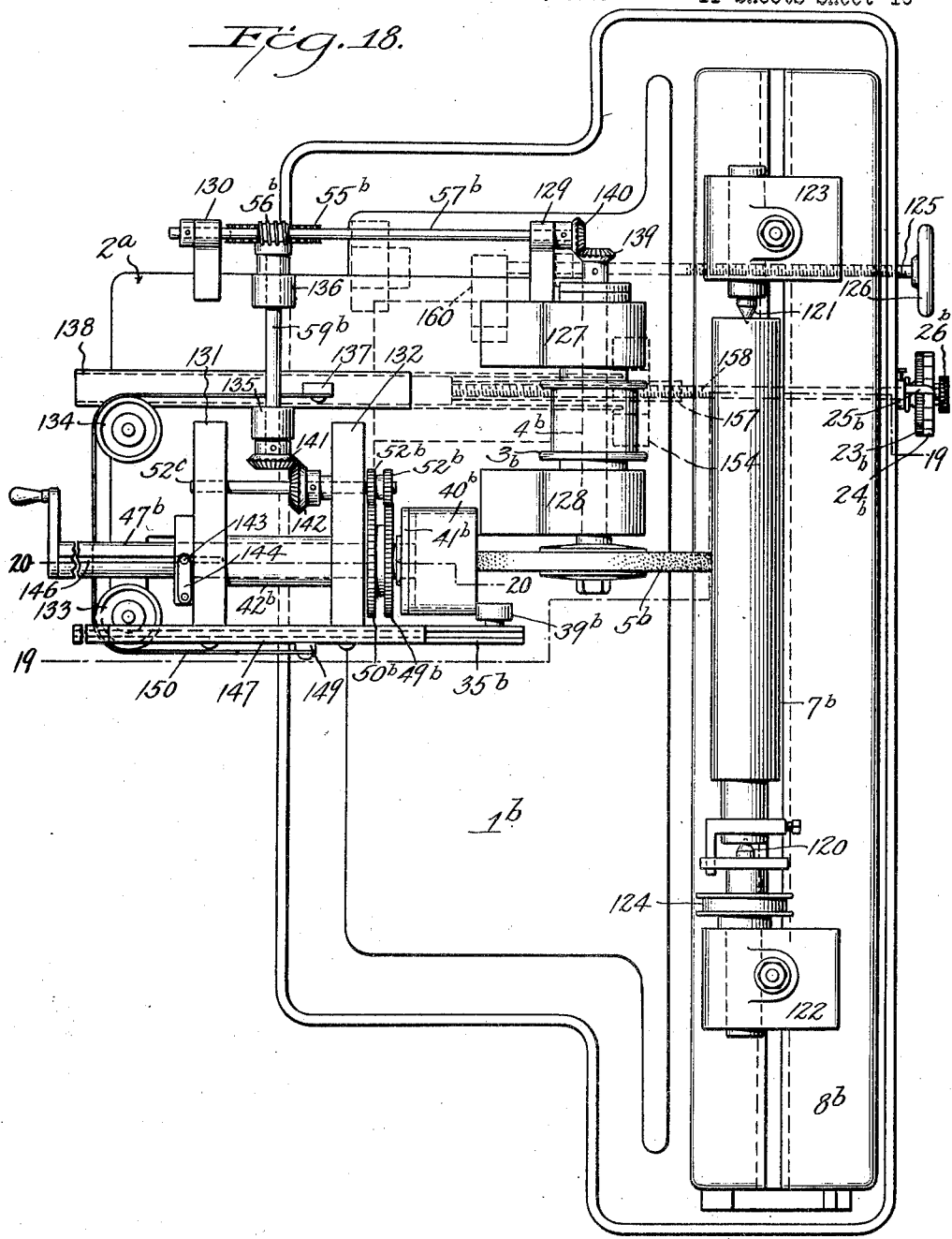

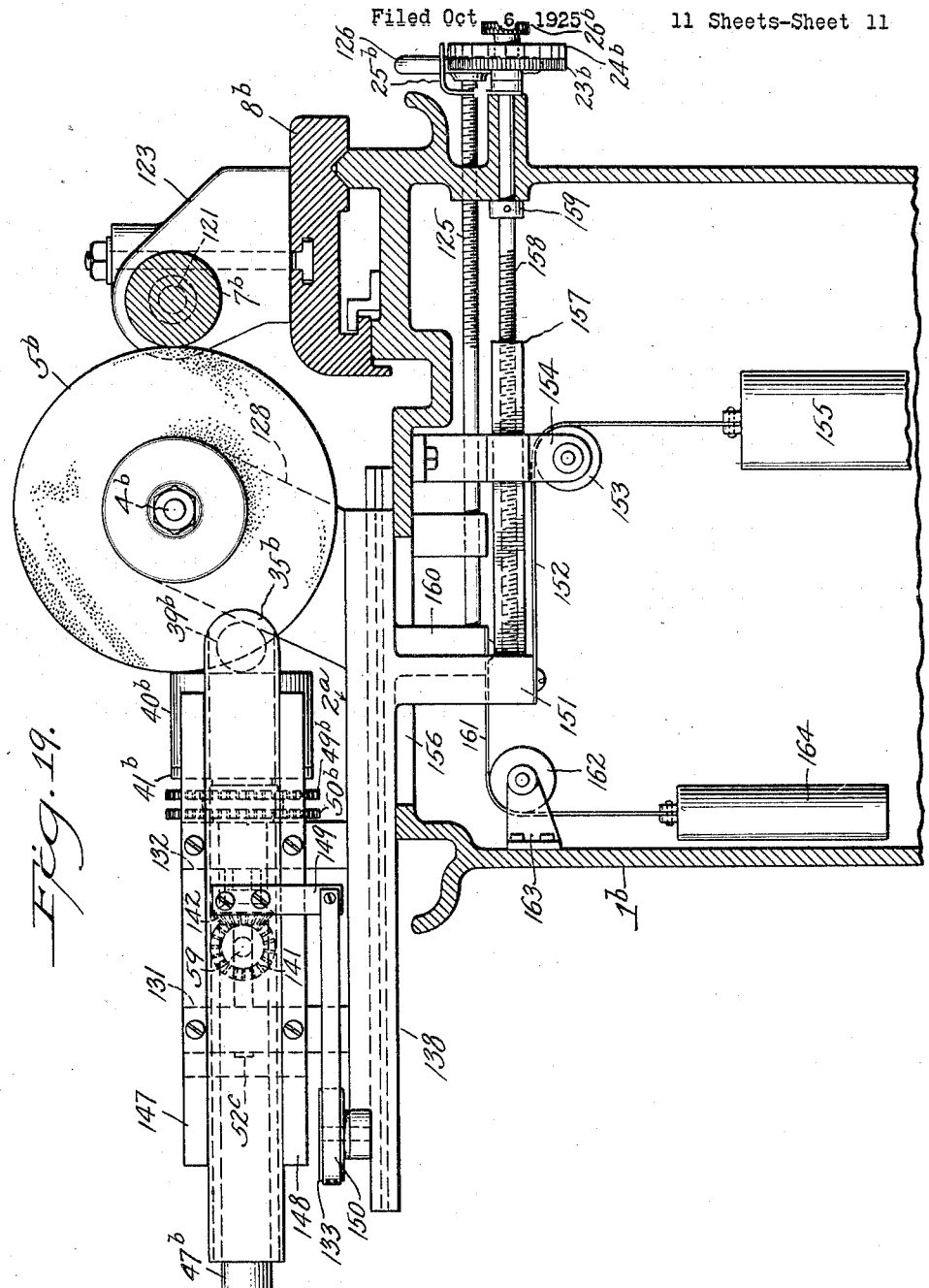

Patented Jan. 3, 1928.

1,655,099

UNITED STATES PATENT OFFICE.

JAMES V. HULSE, OF GENEVA, NEW YORK.

METHOD OF GRINDING.

Application filed October 6, 1925. Serial No. 60,866.

My invention relates to a method of metal working with cutters of the abrasive type. It has for its object the application of a new method for securing exact dimensions of the finished work. To this end it comprises a method and means which includes a calipering controller which is slowly advanced towards and upon that part of the abrasive surface that is doing the grinding. The face of this controller is constantly being ground off in small amount which amount is inversely proportional to any retreat of the abrasive surface due to wear or other causes. This constantly renewed or corrected surface of this calipering controller is then utilized as a abutment against which a coacting yieldingly held roller runs, the axis of which is definitely oriented to the work support or abutment, to the end that any advance of the face of the controller is immediately transmited to the work support so that at the conclusion of a cut this work support shall have approached the cutter to the full extent of its predetermined advance and effected a reduction of the work exactly to the required predetermined dimension. A further object of my invention is to provide means for employing my self-correcting controller in such a manner that it may either directly act upon the work support and compel the correctional advance or act in such manner that that correctional advance is permissive thus adapting its application to all classes of grinding machines.

The specific instrumentalities for carrying out my method may readily be incorporated in the general construction of any of the standard types of grinding machines without altering their general character or the method of handling work. I have shown, in the accompanying drawings, the application of my method to a grinding machine of the single stroke type in which the work is compelled directly to approach the cutter and its application to a type of machine in which the feed is regulated by power and is permissive or of the following up variety. The first is calculated to remove excess material in one continuous cut, the other to perform the same function in a series of cuts each of an extent within the capacity of the cutter. Referring to the accompanying drawings:

Figures 1 and 1ª represent a plan view of a horizontal type surface grinder of the single stroke variety embodying my invention.

Figure 2 is a sectional view on about the line 2—2 of Figure 1ª.

Figure 3 is a sectional view of a detail of the chuck setting and feed mechanism on about line 3—3 of Figure 2.

Figure 4 is a section on the line 4—4 of Figure 2.

Figures 5 and 5ª are sectional views of the machine on about the line 5—5ª of Figures 1 and 1ª.

Figure 6:
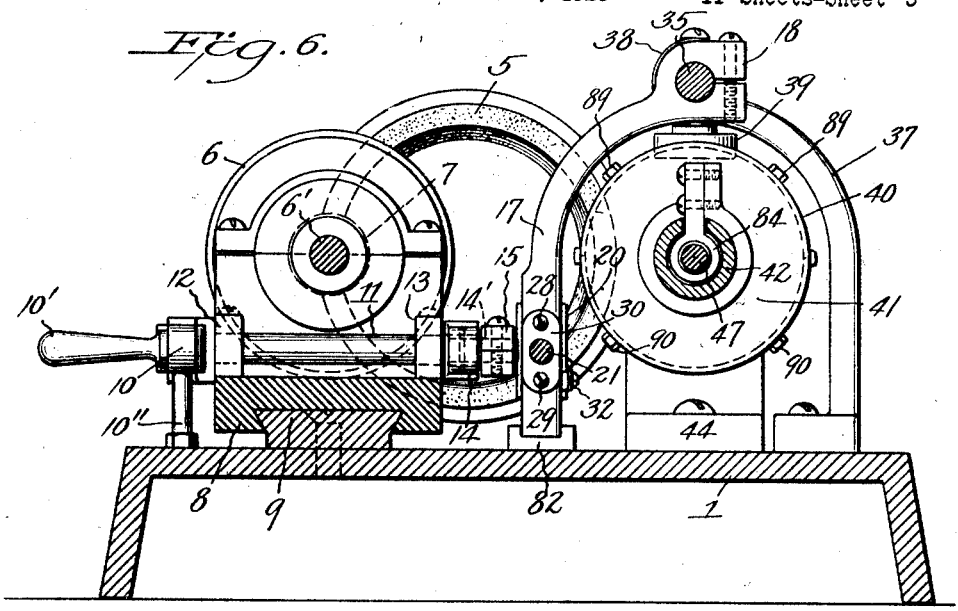

Figure 6 is a section on the line 6—6 of Figure 1ª.

Figure 7:
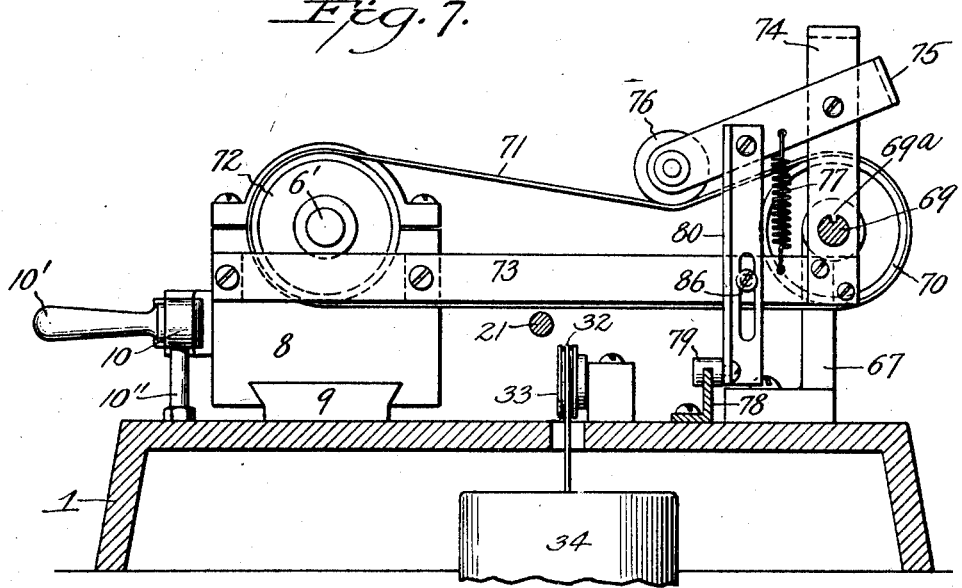

Figure 7 is a sectional view of Figure 1ª on line 7—7, covering detail of chuck rotating mechanism.

Figure 8 is an elevation view of the left hand end of the machine as shown in Figure 1.

Figure 9 is an end view of the two part construction of controller part 40 of Figures 2 and 6.

Figure 10 is a vertical sectional view of a grinding machine of the single stroke vertical type embodying my invention.

Figure 11:
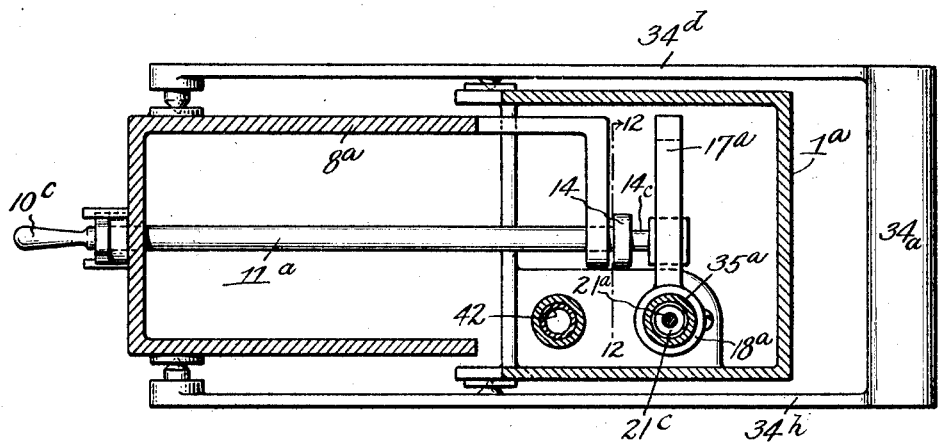

Figure 11 is a horizontal section on the line 11—11 of Figure 10.

Figure 12:
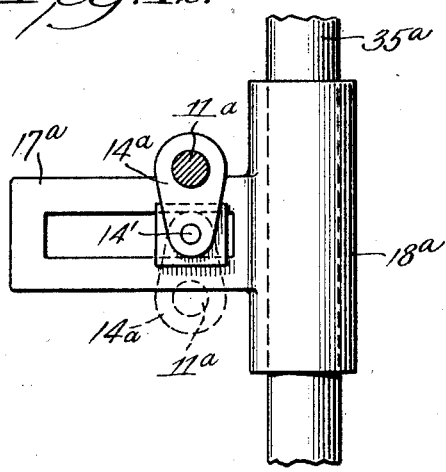

Figure 12 is a front view of a detail of chuck setting and feed mechanism located back of the line 12—12 as shown in Figure 11.

Figure 13:
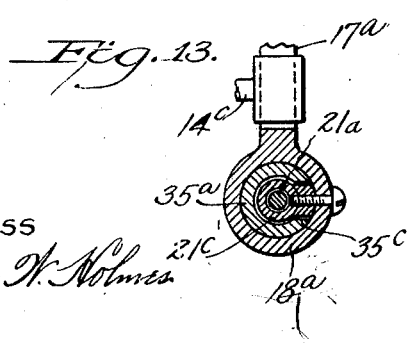

Figure 13 is a section on the line 13—13 of Figure 10.

Figure 14:
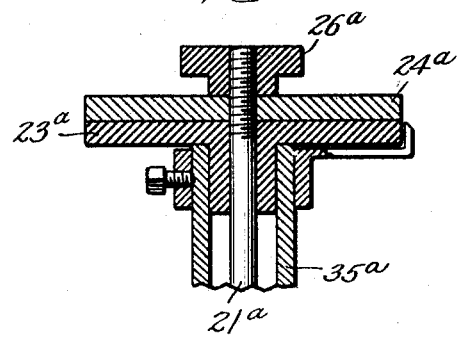

Figure 14 is a section on the line 14—14 of Figure 10.

Figure 15:
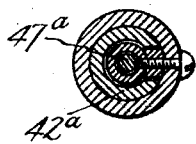

Figure 15 is a sectional view of the controller feed mechanism taken on line 15—15 of Figure 10.

Figure 16 is a plan view of a modification of controller feeding mechanism.

Figure 17 is a sectional view taken on line 17—17 of Figure 16.

Figure 18 is a plan view of a grinding machine of the cylindrical type embodying my invention.

Figure 19 is a sectional view on the line 19—19 of Figure 18.

Figure 20 is a detail section on line 20—20 of Figure 18.

In Figures 1 and 1ª is shown a plan view of a horizontal single stroke surface grinder using a cup wheel as a cutter and a rotary magnetic chuck as a work support and abutment. In the drawings, all wheel and splash guards, water and electric supply are omitted. All the mechanism is supported by the bed plate 1 which is shown in longitudinal section in Figure 2 which bed plate is further supported by legs at either end to a suitable height from the floor upon which it stands. The cup-wheel or cutter 5 is attached by conventional means to the arbor 4 which is journaled in the double bearing pillow-block 2 and is driven by the pulley 3 by being belted to an over-head source of power. The magnetic chuck 6 is supported and rotated by an arbor 6' supported by the double pillow-block 8 which is slidably carried by the slide 9 upon which it may be reciprocated by hand operated means to and from the grinding wheel 5. The work piece 7 is shown interposed between the abutment or working face of the chuck 6 and the cutter or wheel 5. The position of the parts of the machine as shown are that of the conclusion of a cut or at the point where all excess material has been removed and the cutter has ceased to cut. The pillow-block 8 carries a transverse shaft 11 in journals 12 and 13—Figs. 1ª and 6, which shaft is provided at the forward end with the crank 10 and 10' and at the rear end with the crank 14 and pin 14'. The pin 14' engages one end of the connecting rod 15, the opposite end of which engages the pin 16, which pin acts as a fulcrum so that when the crank 10 is raised and swung over through an arc of 180 degrees so as to extend to the left, the crank 14 has reversed its position so that the axis of the shaft 11 is to the right of the axis of the pin 14', and the pillow-block 8 has been forced to a distance twice the length of the crank 14 to the right. This movement withdraws the chuck 6 from working relation to wheel 5 for a change of work piece 7. To make a cut the handle 10' is swung over to the right until the workpiece engages the wheel 5. The handle is then slowly lowered, following up the cut until it is stopped by the pin or stop 10'' which impinges on the top of the bed plate 1, as in Figs. 6 and 7. In this position of the parts, the axis of shaft 11, the pin 14' and the pin 16 are brought into horizontal alignment which makes it certain that at or during the instant of concluding of the cut, the relative positions of the axis of the pin 16 and the abutment or working face of the chuck 6 are every time positively restored and may not be forced by the operator to any false relation. Pin 16 is mounted in sliding block 20 which is slidably supported and guided by the slot 20' in the yoke 17. A screw shaft 21 is threaded in the yoke 17 which shaft is operable by the hand-wheel 23—24. The block 20 is held in constant contact with the end of the screw shaft 21 by the compression spring 31 which is interposed between the side of the yoke 17 and the stirrup plate 30 through which the shaft passes and which is supported by said shaft which is surrounded by the coils of the spring 31. Tension of the spring 31 is transmitted to the block 20 by the draw bars 28 and 29 which connect the block 20 with the stirrup plate 30. Thus the relative position of the pin 16 to the yoke 17 can be altered at will by the operation of hand wheel 23—24. This setting operation will be referred to later, for, at this point it is only necessary to show how the relative positions of the working face of the chuck 6 and the yoke 17 are altered for set-up purposes.

Journaled on bearing supports 43 and 44, Figs. 1 and 1ª, is shown the tubular shaft 42. Its ends terminate in bearings 45 and 46 which are bored to support the threaded draw-bar 47, see Figs. 5 and 5ª. Slidably supported on shaft 42 is the flanged hub 41. This hub rotates in unison with shaft 42 and as it functions, is moved to the left by the draw bar 47 which is threaded in the nut 84 which extends out through an elongated parallel slot in said shaft and is attached (Fig. 5ª) to a radially disposed fin which is a part of hub 41. This draw-bar 47 extends to the left through its support 46 and carries the crank 48 with its handle 51. As shown in Fig. 5, a pin which is a part of the handle 51 engages one of a series of index holes in the gear 49, see Fig. 8. By withdrawing this pin from engagement with this gear 49, the handle may be turned in either direction and this construction thus provides hand-operated means for rotating the draw-bar 47 independently, enabling an operator to position the hub 41 as desired. The mechanical means for operating the shaft 42 and for rotating the draw-bar 47 relative to shaft 42 which both are being revolved as a unit, is shown in Figs. 1, 1ª and 8. Shaft 42, draw-bar 47 and hub 41 with its attached parts rotate very slowly as a unit, while the draw-bar 47 rotates in relation to the shaft 42 at a very much reduced rate of speed. Supported and rotated by the wheel arbor 4 is the shaft 57. Its outer end is supported in the bearing 58. This shaft carries the worm 56 driving worm gear 55 which is supported on and drives shaft 59 running on bearing supports 60 and 61. Shaft 59 carries bevel gear 54, meshing with bevel gear 53, carried on a shaft running on bearing supports 62 and 63, which shaft carries the pinion 52, which in turn drives the gears 49 and 50, which are here paired and rotate together in the same direction, but, at not quite the same rate of speed. A very considerable reduction of speed between the arbor 4 and the shaft carrying bevel gear 53 has been obtained. A further reduction is secured between the pinion 52 and the gears 49 and 50. Gear 50 drives shaft 42. Gear 49 has no direct connection with shaft 42 but drives the screw rod or draw bar 47. Gear 50 is provided with 99 teeth while gear 49 carries 100 teeth. Both gears are driven by pinion 52 which carries 16 teeth. Both gears are thus driven at approximately the same rate of speed. The direction of their joint revolution is left handed as seen in Figure 8, but at every revolution, gear 49 lags back to the extent of one tooth which advances it in right handed relation to gear 50 just to that extent. Therefore, during 100 revolutions of gear 50, gear 49 has made one revolution to the right in relation thereto and rotated screw shaft 47 to the right in nut 84, and has drawn hub 41 to the left to the extent of one thread on draw-bar 47, thus providing a very slow and steady feed of the hub 41 to the left.

Attached to the hub 41 is the hollow cylinder 40. This cylinder is shown as being made up of two sections as illustrated in Fig. 9. The two parts are assembled into a cylinder and secured to the hub 41 by screws as at 89 and 90. It may thus be readily removed or replaced. When the machine is set in operation, the operator, by means of the hand operating means already described, moves hub 41 and this cylinder 40 to the left until the left edge of the part 40 engages the cutter or cup-wheel 5. As soon as contact is made the pin in handle 51 is re-engaged in the nearest index hole in gear 49, and mechanical feed of hub 41, and cylinder 40 to the left is set up. The left edge of the cylinder or controller 40 is thus constantly advancing upon the wheel 5 and is being ground away to the extent of its advance in a field apart from that occupied by work piece 7. The rate of advance of controller 40 upon wheel 5 is constant and uniform under these particular conditions. The cutting face of the wheel 5 and the left edge of the controller 40 are now constantly revolving in the same plane. During any period, when there is no work on chuck 6 and consequently no wear on wheel 5, controller 40 is obviously being ground off to the full extent of its advance upon wheel 5. When wheel 5 is engaged with a work piece and during that cutting period loses any material from its face by disintegration or otherwise, and its effective cutting plane has receded to any extent, its effective grinding capacity upon controller 40 is either diminished or discontinued until the advance of controller 40 again brings it into full grinding contact with the wheel 5, thus restoring the working faces of the two parts to a common plane. If, for the purpose of removing a large amount of excess material from the work piece a heavy cut is taken which reduces the face of the wheel 5 to such an extent that the feed of controller 40 has been exceeded and a gap between the two parts occurs, the operator has recourse to the hand operated feed for bringing the two parts in working contact before the whole cut is finished.

It has been shown how the left edge of the controller 40 is automatically maintained in a plane precisely common to that of the cutting face or plane of the cutter or wheel 5. The edge of this controller 40 provides an abutment which I utilize for maintaining the face of chuck 6 in constant dimensional relation to the face of the cutter or wheel 5.

Referring to the first three figures in the drawings: A bar 35 is carried by supports 36 and 37 to freely slide in those supports. A block 38 is clamped to that bar and carries the roller 39 which bears against and is rotated by the abutment afforded by the left edge of the controller 40 and which is forced to the left by any advance of the face of that abutment in that direction. This bar 35 through connecting arms 18 and 19 support the yoke piece 17. The lower edge of this yoke 17 is slidably guided and positioned by the grooved guide strip 82, Fig. 5. In Fig. 2 is shown a cable 32 which passes over the roller 33 and down through a hole in bed plate 1 and depending therefrom is the weight 34. This cable 32 is attached to yoke 17 and tends to constantly draw it to the right, and acting through intervening parts constantly forces roller 39 against and in working contact with the abutment portion of controller 40. Any advancement of the abutment to the left carries all connected parts with it. Thus we have as a slidably mounted unit, all the parts between roller 39 and the chuck 6, which unit is being positively forced to the left by the action of the roller on the abutment furnished by controller 40 and being yieldingly held to the right by the weight 34 to the end that I have a direct acting mechanism that keeps the working face of the chuck 6 a predetermined distance from the cutting plane of the cup-wheel 5.

Referring to Figs. 1ª and 5ª: Attached to the right end of hollow shaft 42 is the gear 64 which drives the shaft 69 through the medium of pinion 65 at a speed approximately that of pinion 52. This shaft 69 is mounted on bearing supports 67 and 68 at the rear and right of the machine. Slidably mounted on this shaft is the belt pulley 70 which is keyed to be driven by that shaft by the full length key-seat 69ª. This pulley 70 is belted to belt pulley 72 which is mounted upon the arbor that supports chuck 6, by means of tight and loose belt 71. Pulley 70 is kept in alignment with pulley 72 following the movements of pillow-block 8 on its slide 9 by the bar 73 which is mounted on studs on the right hand end of that pillow-block and extends rearwardly underneath the shaft 69. At the rear end of bar 73 is carried an inverted U shaped member 74 which is positioned so that each of its vertical members serve to drive pulley 70 in axial direction following movements of bar 73. Pivotally supported upon the upper end of the vertical member 74 is the U shaped member 75. Between its forward and open ends is the idler pulley 76 rotatively mounted to bear on the driving belt 71. In the position in which it is shown in Fig. 1ª it is holding belt 71 in driving tension as its support 75 is being forced in operative direction by the tension spring 77 extending from part 75 to bar 73. In Figs. 1ª, 2 and 7 is shown the cam plate 78 mounted on bed plate 1 in the path of roller 79. Roller 79 is carried by the bar 80 which is attached at its upper end to swinging member 75 and is guided for vertical movement by the bar 73 where it crosses that bar through the medium of screw and slot 86. When pillow-block 8 is moved to the right to carry chuck 6 out of operative position, roller 79 engages the inclined face of the cam plate 78 and is elevated thereby to force bar 80 to operate to swing the part 75 and its idler 76 up against the tension of spring 77 to raise pulley 76 up and out of contact with belt 71 thereby relieving the driving tension of that belt. When the chuck 6 is again moved to the left to operative position, all these parts operate in reverse order and pulley 70 again drives pulley 72, and chuck 6 is rotated for the purpose of making a cut on work piece 7.

The mechanism thus far described fully carries out my method and provides a machine that, as a surface grinder, will meet and cover all the necessities of general practice. My method is also of very great value in dimensioning non-magnetic or an endless variety of non-metallic substances of widely varying texture in which case magnetic chuck 6 would be replaced by a pneumatic chuck or a face plate and clamps. A very wide range of abrasive wheels is made to meet the particular textural nature of the very many substances that are now being finished by abrasive wheels. In practice where wheels are of necessity used with a very soft bond and which would not freely grind off or remove material from the controller 40 which is herein shown to be made of cast iron, it will be advisable to use controllers made of other material or of any firm frangible non-metallic substance such as terra cotta or other similar pottery product. In this case, the section of controller 40 will be thickened so as to provide a longer radial contact with roller 39. The foregoing will also be true where wheels of hard bond and very fine grain are used in which the cutting effect is produced rather more by friction than abrasion. The character of the material used for controller 40 is at all times to be of such a character that its advance upon the wheel 5 is to be ground off or removed by the wheel freely and completely.

In instances where the work pieces are to be attached to face plates or their equivalent and considerable time is taken in their removal and replacement, and, to reduce unnecessary consumption of material in controller 40, I have provided means for arresting the advance of that controller during the work change period when it is desirable to do so.

Referring to Figs. 16 and 17, Figure 16 is a plan and partially sectional view of a modification of the means for driving draw-bar 47 as shown in Figs. 5 and 5ª. This mechanism provides means for mechanically rotating draw-bar 47ᵈ at the same speed as shaft 42ᵈ, and cancelling the differential rotation of that shaft and its feed to the left of hub 41 Figure 5ª, and particularly during the period when the pillow-block 8ᵈ has been withdrawn to the right out of operative position. Gear 49ᵈ has been spaced apart from gear 50ᵈ and is free to revolve on sleeve 95ᵈ, mounted to revolve on draw-bar 47ᵈ between a collar integral with that sleeve and the specially provided index wheel 96ᵈ, which is keyed to the left end of that sleeve. Gears 49ᵈ and 50ᵈ are each provided on their inner faces within their tooth diameters with teeth forming crown clutch engaging members. Between gears 49ᵈ and 50ᵈ is the clutch member 94ᵈ which is mounted to slide axially on sleeve 95ᵈ and is keyed to drive that sleeve at a speed equal to that of either of the gears 49ᵈ or 50ᵈ. This clutch member is deeply grooved between its ends to accommodate the vertical pin 97ᵈ which moves this clutch axially and selectively to engage either of its opposing gears. When this clutch is engaged with gear 49ᵈ as shown, it drives the index wheel 96ᵈ through the medium of sleeve 95ᵈ at the same rate of speed as gear 49ᵈ so that that gear functions as is shown in Fig. 5. When this clutch is engaged with gear 50ᵈ gear 49ᵈ becomes an idler and the clutch 94ᵈ then rotates index wheel 96ᵈ at precisely the same rate of speed as gear 50ᵈ and screw shaft 47ᵈ rotates in unison with shaft 42ᵈ when it ceases to draw hub 41 Figure 5ª to the left, holding it in a fixed position of shaft 42ᵈ. For the selective control of clutch 94ᵈ: pin 97ᵈ is carried at the free end of vibrating arm 98ᵈ which is supported and pinned on shaft 99ᵈ which shaft extends down through bed plate 1ᵈ. As shown by dotted line in Fig. 16 the lower end of this shaft is pinned to an arm 100, attached to the free end of which is one end of draw bar 102 which extends underneath bed plate 1ᵈ to the right and front of the machine where its other end is attached to the free end of arm 103, which arm is pinned to shaft 104, extending up through bed plate 1$^d$ and carrying arm 105, which is pinned thereto (see Fig. 17). A bearing projection 105' on the free end of arm 105 rests against cam plate 106 which holds it in the position as shown. This bearing projection is held against cam plate 106 by the tension spring 101, (Fig. 16) which operates to constantly draw the free end of arm 98$^d$ to the right and through draw bar 102 to swing the free end of arm 105 in the direction of cam plate 106. Pillow-block 8$^d$ and chuck 6$^d$ are here shown in operative position. When these parts are moved to the right to work changing position, the free end of arm 105 swings to the rear, spring 101 is released to act on arm 98$^d$ to swing its free end to the right which through pin 97$^d$ carries clutch 94$^d$ into engagement with gear 50$^d$ cancelling the feed function of draw bar 47$^d$. As shown in Figs. 16 and 17, means is provided for rendering this throw-out mechanism inoperative. Near the free end of arm 105, is mounted on the bed plate 1$^d$, the block 109. This block is slotted at its upper side throughout its length and a leaf 110 is pivoted to swing therein. This leaf is of such length that it can be swung over to the right so that it engages and holds the free end of arm 105 in the position as shown. In this position the clutch 94$^d$ is constantly held in engagement with gear 49$^d$. As shown in Fig. 17, cam plate 106 is slidably mounted on the front of pillow-block 8$^d$ and is supported thereon by the T slot 108 coacting with screw and nut 107. This cam plate can thus be adjusted to operate in connection with work pieces of different dimensions.

Referring further to Fig. 16. In order to provide further for the exigencies of the very wide range of work that can be done on my machine, I have provided means for operating the controller mechanism at different speeds relative to the speed of wheel 5 (Figure 1). Mounted on bearing supports 91$^d$ and 92$^d$ is auxiliary shaft 90$^d$ which shaft carries the worm 56$^d$ driving worm gear 55$^d$. Mounted on this shaft 90$^d$ and shaft 57$^d$ are the stepped cone belt pulleys 88$^d$ and 89$^d$, which are shown as being operatively connected by the drive belt 93$^d$. In this figure mitre gears 53$^d$ and 54$^d$ take the place of bevel gears 53 and 54 as shown in Figure 1, their function being the same.

When the grinding machine described in Figs. 1 and 1$^a$ is to be set in operation, and before it can be properly set to produce the desired predetermined dimension of a work piece, the zero point on hand wheel 23—24 must be found and established. In Fig. 2 the hand wheel 23—24 is shown as a split wheel. The part 23 is secured to the screw shaft 21 and the part 24 is shiftable rotatively in relation to part 23 and is held in any adjusted position by the thumb screw 26. When the machine is started, a work piece as shown, 7, is ground to a finish cut with whatever setting may occur. This piece is then very carefully measured. The pointer 25 is mounted to swing on the shaft 21 at the point where it passes through its bearing support 22. This pointer is made of flat material, and is bent to form two parts at right angles to each other. One part extends radially from the shaft 21 and the other extends in axial direction of that shaft and overhangs the hand wheel 23—24, a thinned edge serving as an indexing line. The hand wheel 23—24 follows all the movements of yoke 17, and shaft 21 reciprocates through its support 22 to accommodate that movement. The radial part of this pointer is slotted as shown at 25$^b$ in Fig. 1$^a$ adjacent to the thumb screw 27 to permit of its oscillation on shaft 21 for adjustment through an arc greater than five divisions of the wheel 24. The operator then sets this pointer to the reading secured by measuring work piece 7 within the multiple of five one thousandths on wheel 23 without moving that wheel, and then sets the part 24 to indicate the proper numeration of that multiple as a fractional part of fifty one thousandths, the shaft 21 being in this instance threaded twenty pitch. Zero on wheel part 24 then becomes a fixed point and readings for setting chuck 6 to a desired distance from wheel 5 are taken from that point, counting turns of the wheel 23—24 for each twentieth of an inch and the peripheral scale of the two wheels for fractional parts of that unit. The zero point thus established remains as such until either the roller 39 is shifted on the rod 35 or the face of chuck 6 is reground as a truing up operation.

Figures 10 to 15 inclusive show the relative working position of the mechanism embodying my invention to a single stroke surface grinder of the vertical type. In this type of machine the working face or abutment of chuck 6$^a$ faces upward, wheel 5$^a$ overhangs that chuck and faces downward. In taking a cut the chuck 6$^a$ is raised to make contact with the wheel for work piece 7$^a$. Wheel and splash guards, water and electric supply systems are omitted. Also, means for rotating chuck 6$^a$ which can be driven from hollow shaft 42$^a$ is not shown.

Aside from the vertical arrangement of the moving parts, the main difference in this type or form of construction is in that the knee or chuck support 8$^a$ is mounted on vibrating arms instead of a slide. These arms comprise a double set, or two free arms and two axially connected so that they carry knee 8ª parallel to all their axial supports. These arms 34ᶜ and 34ʰ are pivotally supported on the column 1ᵃ at 34ᶠ on either side of the front of that column. Their forward ends are pivotally attached to the knee 8ª at 34ᵍ and knee 8ª plays up and down between this two pairs of supporting arms. The upper pair of arms 34ʰ extend rearwardly and are connected to and form a part of the weight 34ᵃ which serves to connect them axially as a unit. This weight 34ᵃ as a part of arms 34ʰ serves as a counterbalance for knee 8ª. The capacity of this weight 34ᵃ however, is such that knee 8ª is underbalanced to some extent so that it serves in the same capacity as weight 34ᵃ in Fig. 2, keeping roller 39ᵃ in contact with controller 40ᵃ, and, yielding, in like manner to the rising abutment presented by that controller. In Fig. 10 the knee member is shown in the form of the three sides of a box like structure. In this figure an extension of one of the side walls of the knee extends rearwardly and then to the right and provides a rear bearing support for the operating shaft 11ᵃ which carries crank 14ᵃ and pin 14ᶜ. The pin on this crank engages a sliding die traversing a horizontal slot in the yoke member 17ᵃ which is a part of the sleeve slidably supported on the hollow bar 35ᵃ, see Figs. 11 and 12. This slot and die function as an equivalent to the connecting rod 15 in Fig. 1ᵃ, raising and lowering knee 8ª, raising it to working position and lowering it to work changing position, and as shown in Fig. 12 moving it a fixed distance at each movement of the handle 10ᶜ from one of its stops to the other. This sleeve 18ᵃ functions similarly to the sliding block 20 in Fig. 2. The bar 35ᵃ is here shown as a tube with the screw bar 21ᵃ axially located therein engaging the nut 21ᶜ which has attachment to the sleeve 18ᵃ through the slot 35ᶜ, and, by means of hand wheel 23ᵃ—24ᵃ provides means for adjusting the relative positions of roller 39ᵃ and pin 14ᶜ for the purpose of securing predetermined work dimensions between chuck 6ᵃ and wheel 5ᵃ. I have thus shown how the mechanism embodying my invention can readily be incorporated in the general make-up of a well known standard type of grinding machines.

Referring to Figs. 18, 19 and 20: These figures show the incorporation of my invention in combination with a grinding machine of the usual or conventional cylindrical type or the class of machines in which the work is axially mounted on centres, revolving chucks or in special devices suited for the occasion. In the machine here shown, wheel and splash guards and water supply system and the mechanism for reciprocating the work table 8ᵇ are omitted. The latter device, together with means for advancing the wheel upon the work at each stroke of the work table are well known and in common use.

In Fig. 18 is shown a top plan view of a cylindrical grinder. The base 1ᵇ is shown in Fig. 19 in section on line 19—19, and is of the conventional box like form comprising a depressed top. A raised portion of this depressed top carries the wheel support 2ᵃ which is gibbed to the portion to reciprocate at right angles to the axis of the work piece 7ᵇ. The work piece 7ᵇ is here shown mounted to revolve on centres 120 and 121 which are supported by head blocks 122 and 123 on the reciprocating work table 8ᵇ. This work piece 7ᵇ is revolved during the cutting operation by drive pulley 124, which is belt driven from an overhead source of power. Work table in this class of machines is automatically reciprocated by power from right to left, continuously to present the whole length of the work piece to the wheel 5ᵇ for the purpose of removing a cut within the capacity of the wheel. At the end of each cut so taken, the wheel support 2ᵃ is automatically moved forward to engage wheel 5ᵇ with work piece to the extent of the depth of a successive cut. Many forms of stop mechanisms are in common use for automatically arresting this forward feed at a point where the work piece has been reduced to a diameter approximately that, or plus, of the finished diameter required. Feed screw 125 and hand wheel 126 are here shown as a diagrammatic representation of the last described automatic device. Wheel support 2ᵃ is provided with integral supports for the wheel arbor 4ᵇ, 127 and 128, and for the shaft 57ᵇ, 129 and 130, for the hollow shaft 42ᵇ, shaft 52ᵇ, and the support of bar 35ᵇ, 131 and 132, the band wheels 133 and 134 and for the shaft 59ᵇ, supports 135 and 136. This support 2ᵃ is bifurcated from about its centre and toward the rear by a channel for the travel of the block 137 on bar 138. Wheel or cutter 5ᵇ is mounted on its arbor 4ᵇ to revolve in bearings 127 and 128 driven by pulley 3ᵇ from an overhead source of power. Mitre gear 139 mounted on the end of arbor 4ᵇ drives its mate 140 and shaft 57ᵇ. On shaft 57ᵇ is the worm 56ᵇ driving worm gear 55ᵇ at reduced speed. This gear drives shaft 59ᵇ and mitre gear 141 and its mate 142 on shaft 52ᶜ mounted in supports 131 and 132. Shaft 52ᶜ carries the divided pinion 52ᵇ—52ᵇ engaging gears 49ᵇ and 50ᵇ. As shown in Fig. 18, gear 50ᵇ drives the hollow shaft 42ᵇ. Mounted to reciprocate axially in hollow shaft 42ᵇ is the screw thrust bar 47ᵇ. These parts rotate operatively in unison. The pin, 143, held in operative position by the leaf spring 144 engages the elongated key-way 146 in thrust bar 47ᵇ to maintain that unison. Gear 50ᵇ which drives hollow shaft 42ᵇ, is cut with 99 teeth. Gear 49ᵇ is cut with 100 teeth.

Split pinions $52^b$—$52^b$, each having the same number of teeth, drives these two gears at the same peripheral speed but not at the same number of revolutions within a given period. Gear $49^b$ lags back to the extent of one tooth at each revolution of gear $50^b$, so that while gear $50^b$ makes 100 revolutions to the left, gear $49^b$ has lagged back one whole revolution which has turned it to the right one revolution relative to gear $50^b$. Gear $49^b$ is threaded on the screw thrust bar $47^b$, and with the end of hollow shaft as an abutment moves that thrust bar forward to the extent of the pitch of one thread carried thereon. On the forward end of thrust bar $47^b$ is mounted that flanged hub $41^b$ to which is attached a hollow cylinder $40^b$. See Fig. 20. Referring to Fig. 19: The upper edge of this hollow cylinder $40^b$ shown as lying in a plane horizontal to the axis of wheel $5^b$. In Fig. 18 the axis of this cylinder $40^b$ is shown as lying in a vertical plane midway between the two sides of wheel $5^b$. The edge of cylinder $40^b$ is, as shown, being revolved and fed against a point of wheel $5^b$ diametrically opposite the point where it engages the work piece $7^b$, and as so exposed and fed is, while the machine is running, being ground off to the extent of its advance on that wheel, less however to the extent of any loss of diameter of wheel $5^b$ due to wear or disintegration in its abrasive action on work piece $7^b$, or a dressing or sharpening operation performed on the wheel $5^b$ during a cutting period, or both. Following up any loss of diameter of wheel $5^b$, the edge of cylinder $40^b$ advancing under its forward feed serving as a controller abutment carries roller $39^b$, which is shown as running against the edge of that controller, forward and to just the extent of that loss of diameter of wheel $5^b$. Roller $39^b$ is carried on the forward end of bar $35^b$. This bar is mounted to reciprocate between the tongued rails 147 and 148 which rails are supported by the support members 131 and 132. Bar $35^b$ carries downwardly projecting bracket 149 to the lower end of which is attached the flexible metal strip or draw band 150 which passes to the rear, and to the right around the flat faced idler wheels 133 and 134, mounted on part $2^a$, extends forward and is attached to the upright block or projection 137 on bar 138. This bar is tongue and groove guided in wheel support $2^a$ and the lower side of this bar lies flush with the under side of support $2^a$ as it rests on its support which is a part of the base $1^b$. As thus connected bars $35^b$ and 138 are calculated through the medium of draw band 150 to each drive the other in opposite directions, band 150 being employed as a tension member. Underneath support $8^b$ is the opening 156. Down through this opening is shown a bracket 151 depending from the under side of bar 138. Attached to the under side of base $1^b$ where it forms a support for wheel support $2^a$ is the bracket supporting member 154. This bracket carries at its lower end flat wheel 70 153. Attached to the lower end of bracket 151 is a flat metal flexible strip or draw band 152 which extends forwardly over wheel 153 and at its free end depends weight 155. The tendency of this weight is to draw support $8^b$ forward and incidentally to keep roller $39^b$ on contact with the abutment edge of controller $40^b$ as it acts on bar 138, through band 150, through its supporting bar $35^b$ which is thus being constantly drawn to the rear but is yieldingly held to respond to any forward advance of the abutment on controller $40^b$. Any such forward advance of the abutment afforded by controller $40^b$ is thus translated into a precisely corresponding advance of the front edge of the bracket 151. Supported in a housing on support 154 is a square bar 157 bored and threaded throughout its entire length. Threaded into this square bar is the screw shaft 158 which is journalled in the base $1^b$ through which it passes and carries the split hand wheel $23^b$—$24^b$. This shaft carries the thrust collar 159 which bears against a faced off portion of base $1^b$. Through the hand wheel $23^b$—$24^b$ the bar 157 can be adjusted longitudinally to bring its rear or abutment end to any predetermined position in the path of the front edge of the bracket 151. These parts are here shown in contact. The position of all of the parts of the machine as a whole is shown as that of the termination or finishing of a cut on work piece 7. Bar 157 has thus arrested forward movement of wheel support $8^b$ and the advance of wheel $5^b$ on work piece $7^b$, which has now been ground to a predetermined diameter.

Depending from the under side of wheel support $2^a$ and extending down through the opening 156 is the bracket 160, see Fig. 19. This bracket again extends to the right, and its end is in the path of feed screw shaft 125 which is operated by hand wheel 126. This screw shaft is threaded in the base $1^b$. It can be used to thrust support $2^a$ to the rear but has no driving control over its forward movement, as that is a function of weight 155. Through this hand wheel 126 the operator can now move support and its wheel back away from the centres 120 and 121 for a change of work piece. Attached to the rear inside wall of the base $1^b$ is the bracket 163 carrying flat wheel 162. Attached to the bracket 160 and extending rearwardly and over the wheel 162 is the flat flexible metal strip 161 from the end of which depends the weight 164. The function of this weight is to maintain a tension on band 150 when weight 155 has ceased to function by the arrest of bracket 151 by bar 157. When bracket 151 is out of contact with bar 157, weight 164 subtracts its capacity from that of weight 155, hence the greater size of the latter.

The setting of the hand wheel 23$^b$—24$^b$ as to its zero point in relation to the pointer 25$^b$ is accomplished in the same manner in this machine as has been described for Figs. 1$^a$ and 2.

The machine shown having finished a cut, the operator through the medium of hand wheel 126 moves wheel support 2$^a$ back to clear the work piece and replaces it with another piece. The machine is then set in operation and he feeds the wheel forward until it picks up the cut on the work piece which is now revolving and being traversed to and fro axially by mechanism driving carriage 8$^b$. Feed mechanism hereinbefore referred to now continues to operate wheel 126 intermittently to advance wheel 5$^b$ for taking its successive cuts as weight 155 is keeping the bracket in contact with the rear end of feed shaft 125. Bar 157 is under these conditions now out of contact with bracket 151. The cutting operation continues until the forward feed of support 2 brings the two parts again in contact. At this point further forward feed of wheel 5$^b$ is arrested as the desired diameter of the work piece has been reached. If the power feed of wheel 126 continues, the rear end of shaft 125 merely backs away from bracket 160, becoming inoperative, wheel 5$^b$ being thus permitted to remove all excess material from work piece 7$^b$ and only that, for through controller 40$^b$ and its coacting mechanism any loss of the radius of the wheel 5$^b$ from any cause whatever has been translated into a corresponding retreat of the front edge of bracket 151 relative to the axis of that wheel, and support 2$^a$ is permitted to make such further advance before it is arrested by bar 157 as will precisely compensate for that loss of diameter.

As has been described, wheel support 2$^a$ and its attached parts constitute a unit, yieldingly and weight controlled, or actuated in cutting feed direction and the feed for making successive cuts is permissive in character; the wheel following up such feed until it is arrested at the full termination of a cut, bringing the work piece to a predetermined dimension by the action of parts coacting with controller 40$^b$.

It will be evident that the method in effect constantly anticipates a condition of error, both during the period and particularly at the conclusion, of a cut, which method does not depend at all, for its constantly corrective action, upon the accrual of error to any extent in any of its functions.

I claim:—

1. In grinding where the grinding tool and work support are made to approach each other until arrested by a gauged stop, the method of compensating for the wear of the grinding tool, which comprises moving a wearing abutment continuously against the grinding tool, continuously moving the stop to compensate for the wear of the grinding tool and limiting said movement by means bearing against the wearing surface of the abutment.

2. In grinding, the method of effecting cuts unaffected by the wear of the cutting tool, which consists in continuously advancing a reducible abutting member upon the cutting tool during the progress of said cuts, constantly reducing the effective face of said abutment at a speed equivalent to its speed of advancement less the extent of any wear of said cutting tool occasioned by its engagement with a work piece, compelling the differential extent of that advance to thrust forward the yielding support of a coacting roller and employing the forward movement of said roller support to continuously effect compensating equivalent adjustment between the supports of said cutter and work piece.

3. In metal cutting where the depth of a cut is predetermined by a gauged stop, the method of compensating for the wear of the cutting tool, which comprises moving a reducible abutment continuously against the tool, continuously causing the stop to move towards the tool and limiting said movement by holding the stop in fixed relation to the reducing surface of the abutment.

4. In a grinding machine, the combination comprising means for continuously effecting correctional adjustment between the supports of a cutter and a work piece equivalent to any degree of recession of the cutting surface of that cutter due to wear, consisting of a reducible abutting member, means for continuously advancing said abutting member upon said cutting surface during the progress of the cut at a constant speed in excess of the maximum variable speed of recession of that cutting surface, whereby the said abutting member is reduced by said cutting surface to an extent equal to its extent of advancement less the coexistant extent of recession of said cutting surface, a coacting roller axially mounted on a yielding support in constant contact with the effective face of said abutting member, and means for causing the roller support to be thrust forward by that face to the extent of any accrued difference between the advance of said abutting member and the recession of said cutting surface.

5. In a grinding machine, the combination comprising a revolving cutter, a support for a work piece, a revolving reducible abutting member, means for continuously advancing said abutting member upon said cutting surface at a constant speed in excess of the maximum variable speed of recession of that cutting surface, a coacting roller in constant contact with the effective face of said abutting member and a yielding support on which it is axially mounted, and means for causing the said support to be thrust forward by that face to the extent of any accrued difference between the advance of said abutting member and the recession of said cutting surface.

6. In a grinding machine, the combination comprising a rotating cutter with a peripheral cutting surface, a support for a work piece, a revolving, reducible abutting member continuously advancing upon the periphery of said cutter in radial direction and at a point thereon angularly displaced from the point of engagement with the work piece, said advance being at a constant speed in excess of the maximum variable speed of radial wear of said peripheral cutting surface, a coacting roller in constant contact with the effective face of said abutting member, a yielding support for said roller, and means for causing said roller support to be thrust forward by the face of the reducible abutting member to the extent of any accrued difference between the advance of said member and the radial wear of said cutting surface, whereby the extent of that wear is continuously calipered and direct equivalent adjustment of said stop or abutment with relation to said cutting surface is effected, which will permit said cutting surface to reduce said work piece to a predetermined extent, under the control of said limiting stop or abutment.

7. In grinding machines, the combination of a work support, a tool support, a grinding wheel mounted on the tool support, means for causing one of the supports to approach the other, a reducible abutment means for constantly advancing the same toward the grinding wheel so that it will be continuously positioned by the cutting surface of the wheel to compensate for the wear thereof, and means acting in contact with the reducing surface of the abutment to limit the approach of the two supports.

8. In a grinding machine, the combination of a work support, a tool support, a grinding wheel mounted on the tool support, means for moving one of the supports toward the other, a gauged stop limiting the said movement, means including said gauged stop and a constantly advancing reducible abutment constantly positioned by the cutting surface of the wheel controlling said gauged stop and compensating for the wear of said grinding wheel.

JAMES V. HULSE.